United States Patent
Hyvönen et al.

[11] Patent Number: 5,813,496
[45] Date of Patent: Sep. 29, 1998

[54] SYSTEM FOR MONITORING AND CONTROL OF THE CIRCULATION LUBRICATION OF THE BEARINGS OF CYLINDERS AND ROLLS IN A PAPER MACHINE

[75] Inventors: Hannu Hyvönen, Vesanka; Pauli Pakarinen, Jyväskylä; Jukka Koiranen, Jyväskylä; Harri Vähätalo, Jyväskylä, all of Finland

[73] Assignee: Valmet Corporation, Helsinki, Finland

[21] Appl. No.: 607,853

[22] Filed: Feb. 27, 1996

[30] Foreign Application Priority Data

Feb. 27, 1995 [FI] Finland .................................... 950877

[51] Int. Cl.[6] ....................................... F16N 7/40
[52] U.S. Cl. ................... 184/6.4; 184/7.4; 137/487.5; 162/199; 162/252; 162/272; 364/132; 364/189; 364/471.02
[58] Field of Search ............................ 184/6.4, 7.4, 108; 137/487.5, 565; 162/199, 252, 272; 364/132, 188, 189, 471.02

[56] References Cited

U.S. PATENT DOCUMENTS

| | | | |
|---|---|---|---|
| 1,769,007 | 7/1930 | Wiltse | 184/6.4 |
| 4,519,247 | 5/1985 | Horttonen . | |
| 4,614,300 | 9/1986 | Falcoff | 364/189 |
| 4,855,729 | 8/1989 | Takeuchi et al. | 137/487.5 |
| 5,029,672 | 7/1991 | Witczak | 184/7.4 |
| 5,060,760 | 10/1991 | Long et al. . | |
| 5,190,068 | 3/1993 | Philbin | 137/487.5 |
| 5,297,260 | 3/1994 | Kametani | 364/132 |
| 5,356,225 | 10/1994 | Hanes et al. . | |
| 5,544,332 | 8/1996 | Chen | 364/132 |

FOREIGN PATENT DOCUMENTS

| | | | |
|---|---|---|---|
| 65661 | 1/1984 | Finland . | |
| 2016316 | 10/1971 | Germany . | |
| 2028944 | 12/1971 | Germany | 184/6.4 |
| 2229990 | 1/1974 | Germany . | |
| 2058952 | 4/1981 | United Kingdom . | |

*Primary Examiner*—Christopher Verdier
*Attorney, Agent, or Firm*—Steinberg, Raskin & Davidson, P.C.

[57] ABSTRACT

A system for control and monitoring of the circulation lubrication of the bearings of the revolving cylinders and rolls in a paper machine or equivalent in which lubrication oil is fed from an oil-lubrication center or centers through a system of pipes into lubrication points. From these lubrication points, the lubrication oil is passed back through a system of return pipes into the oil-lubrication center or centers. The system includes actuator panels placed and grouped in the vicinity of the lubrication points primarily above the floor level of the paper machine hall or equivalent. From the actuator panels, lubricant feed pipes are passed to several lubrication points placed in the vicinity. The actuator panels have a feed-back connected regulation loop for lubricant flow quantity provided for each lubrication point, which regulation loop includes an oil-flow regulation valve, an actuator motor for same, as well as an oil-flow measurement device and a regulation circuit.

19 Claims, 5 Drawing Sheets

SYSTEM FOR MONITORING AND CONTROL OF THE CIRCULATION LUBRICATION OF THE BEARINGS OF CYLINDERS AND ROLLS IN A PAPER MACHINE

FIELD OF THE INVENTION

The present invention relates to a system for control and monitoring of the circulation lubrication of the bearings of the revolving cylinders and rolls in a paper machine or equivalent, in which system a lubricant such as lubrication oil is fed from an oil-lubrication center or centers through a system of pipes into lubrication points associated with the bearings, from which the lubricant is passed back through a system of return pipes into the oil-lubrication center or centers.

The present invention also relates to a method for control and monitoring of the circulation lubrication of the bearings of the revolving cylinders and rolls in a paper machine or equivalent.

BACKGROUND OF THE INVENTION

In the prior art, a lubrication system for a paper machine or equivalent that circulates lubrication oil to the revolving parts of the paper machine is connected to the bearings of the revolving parts of a paper machine, such as cylinders and rolls. Typically, in a paper machine, there are about 500 points of lubrication, i.e., which constitute the different cylinder and roll bearings. In the prior art, the lubrication system is accomplished so that oil pipes are passed from the lubrication points into the basement spaces situated underneath the paper machine, in which a number of oil flow meter panels are arranged one after the other in the longitudinal direction of the paper machine. In each of these panels, oil flow quantity meters and manual control members of each lubrication point are arranged and are connected with the oil pipe. As known from the prior art, the oil quantities of each lubrication point are determined and set manually to be substantially invariable. It is an important disadvantage of such prior art systems that if a change in the operation values of the paper machine requires changes in the oil quantities at the lubrication points, these changes must be carried out by means of manual regulation separately from the flow meter panels of each lubrication point.

The prior art circulation lubrication system that was described above involves a number of drawbacks, such as that discussed above and which will be discussed in the following in more detail.

It is one of the drawbacks of the prior art circulation lubrication system that the setting of the oil quantities for the different lubrication points must be carried out separately and manually. Manual setting is difficult to carry out and time-consuming. With the use of manual regulation, it has not been possible to take into account the effects of changes occurring in the operation parameters of the machine during machine operation, such as running speed of the machine, temperatures of the lubrication points and equivalent, on the requirement of lubrication of the cylinders and roll bearings. For this reason, it is usually necessary to perform the initial setting of the oil quantity "on the safe side", i.e., to be excessive, which often results in excessive lubrication and the flow of oil out of the lubrication points, which may even result in spoiling of the paper web that is produced. It is a further important drawback that, owing to the large number of lubrication points, long oil pipings are required between the flow meter panels (typically between 20 and 30 panels) and the lubrication points. These long pipings increase the material costs and the costs and time of installation of the paper machine to a significant extent.

OBJECTS AND SUMMARY OF THE INVENTION

Accordingly, it is an object of the present invention to provide a new and improved system and method for monitoring and control of the circulation lubrication of the bearings of cylinders and rolls in a paper machine.

It is another object of the present invention to provide a circulation lubrication system and method in which the drawbacks of the prior art systems discussed above, and others, and substantially eliminated.

In view of eliminating the drawbacks stated above and in view of achieving the objects of the invention, the system in accordance with the invention comprises a number of actuator panels placed and grouped in the vicinity of, i.e., in a region proximate to, the lubrication points primarily above the floor level of the paper machine hall or equivalent. From the actuator panels, lubricant feed pipes are passed to a number of lubrication points placed in the vicinity. The actuator panels comprise a feedback connected regulation loop for lubricant flow quantity, provided for each lubrication point, i.e., a plurality of flow regulation means, which regulation means each comprises an oil-flow regulation valve, an actuator motor for same, as well as an oil-flow measurement device and a regulation circuit for controlling the actuator motor based on the measured oil-flow quantity.

According to the present invention, when the prior art system of circulation lubrication is substituted for by a system of control and monitoring of the circulation lubrication in accordance with the invention, the circulation lubrication of all the points of lubrication can be optimized, also when the operation parameters of the paper machine are changed.

According to the invention, the lubricant quantities for the different lubrication points are regulated automatically so as to be suitable for the operation parameters of the machine by for each lubrication point providing a feedback connected regulation circuit of its own, i.e., individual flow regulation means. The system in accordance with the invention can take into account the running values of the paper machine, such as the machine speed, the paper grade produced, the lubrication-specific parameters, such as, for example, loading and temperatures of the different bearings, other environmental conditions, and/or properties of the lubrication oil that is used.

The present invention can be carried into effect preferably by using the most modern electronics as well as data and control technology in its various component fields.

It is an important advantage of the invention that the circulation oil flow-meter regulation panels of each lubrication point can be placed in groups and in the vicinity of the lubrication points. These panels are placed and grouped so that each panel is connected with one main supply pipe for oil and with several, typically 2 to 8, oil supply pipes passing to the nearby lubrication points. The locations and groups of the panels are made such that the lengths of the oil pipes can be minimized or at least kept on a reasonable level. The panels are placed above the floor level of the paper machine on the tending platform of the machine, with the exception of the panels that take care of the lubrication points of the fabrics placed underneath. The latter panels are placed in the basement spaces below the floor level of the paper machine hall. Owing to this construction, it is possible to reduce the quantity in the system of lubrication pipes and, in this respect, to obtain economies both in material costs and in installation costs of the circulation lubrication system. In the present invention, the actuator panels are placed both at the tending side and at the driving side of the paper machine. Also in the present invention, the number of these actuator panels is typically about 60 to about 120. The actuator panels are connected to actuator coordinators, whose number over the length of the paper machine is typically 3 to 6 both at the driving side and at the tending side of the machine. These actuator coordinators are placed physically on the tending level of the machine. In paper machines, the lubrication points are usually in areas which are difficult in view of maintenance and under severe environmental conditions. The actuator panels and actuator coordinators are selected, dimensioned and protected so that they are able to endure heat, vibration, moisture, and chemicals.

In the actuator panels, the necessary amount of electronics and intelligence is provided. The actuator panels are connected with the actuator coordinators by means of the time-share principle (multiplexing). On the other hand, the actuator coordinators communicate through a suitable communication bus with a control and display unit, which is again connected through a suitable communication bus with the rest of the process automation of the paper machine.

The method in accordance with the invention for control and monitoring of circulation lubrication of bearings of revolving cylinders and rolls in a paper machine situated in a paper machine hall and arranged at a floor level of the paper machine hall comprises the steps of arranging actuator panels above the floor level of the paper machine hall, feeding lubrication oil from at least one oil-lubrication storage means to each of the actuator panels, feeding the lubrication oil from each of the actuator panels to a plurality of lubrication points constituting the bearings of the revolving cylinders and rolls and being situated in a region proximate to the actuator panel, feeding the lubrication oil from the lubrication points to the at least one oil-lubrication storage means, and regulating the quantity of the flow of the lubrication oil through the actuator panels to each of the lubrication points. The regulating step comprises, for each of the lubrication points, the steps of: passing the lubrication oil through a regulation valve, actuating the oil-flow regulation valve to vary the flow quantity of the lubrication oil to the lubrication point, measuring the flow of lubrication oil through the regulation valve, and controlling the actuator based on the measured flow of lubrication oil through the regulation valve. Also, in the method it is possible to control operation of the actuator panels by means of at least one actuator coordinator, couple a control and display unit and the at least one actuator coordinator through a first data transfer bus, and couple the at least one actuator coordinator and the actuator panels through a second data transfer bus. In this case, it is further possible to send one or more control signals from the at least one actuator coordinator to the actuator panels and send values of physical properties from the lubrication points to the at least one actuator coordinator through the second data transfer bus, and transfer the values of physical properties from the at least one actuator coordinator to the control and display unit through the first data transfer bus. The display and control unit can be coupled to a process automation system of the paper machine through a third data transfer bus such that process data necessary for monitoring of circulation lubrication of the lubrication oil is transferred from the process automation system to the display and control unit. Set values and alarm values are determined based on the process data in the display and control unit and the set values and alarm values are transferred from the display and control unit to the at least one actuator coordinator through the first data transfer bus. The actual values and alarms of the circulation lubrication process are also monitored in the display and control unit. Alarms can also be formed in the at least one actuator coordinator and set values, parametering values, and/or equivalent data transferred from the at least one actuator coordinator to the actuator panels. The oil flow to the lubrication points can be measured and regulated independently. Furthermore, it is possible to operate with the time-share principle such that the at least one actuator coordinator multiplexes set values, alarm and/or other actuator parameters through the second data transfer bus to the actuator panels connected to the at least one actuator coordinator and obtains actual values of the actuators from the actuator panels.

In the following, the invention will be described in detail with reference to some exemplifying embodiments of the invention illustrated in the figures in the accompanying drawing. The invention is by no means strictly confined to the details of the illustrated embodiments.

BRIEF DESCRIPTION OF THE DRAWINGS

The following drawings are illustrative of embodiments of the invention and are not meant to limit the scope of the invention as encompassed by the claims.

FIG. 1B is a continuation of FIG. 1A in the machine direction.

DETAILED DESCRIPTION OF THE INVENTION

Figure 1A:
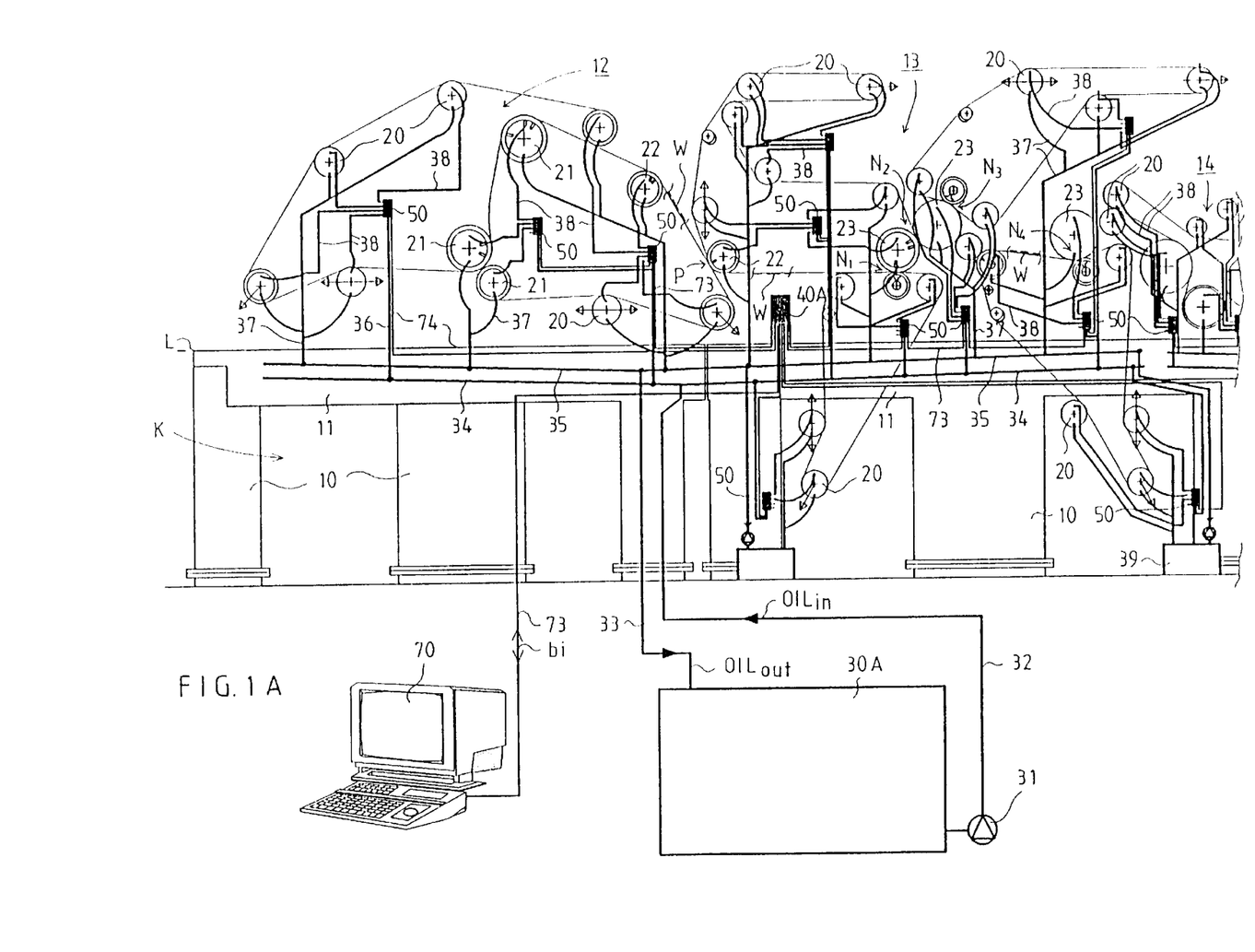
FIG. 1A is a schematic illustration of a system in accordance with the invention for monitoring and control of circulation lubrication as applied to the different lubrication points in the wet end of a paper machine.
Figure 1B:
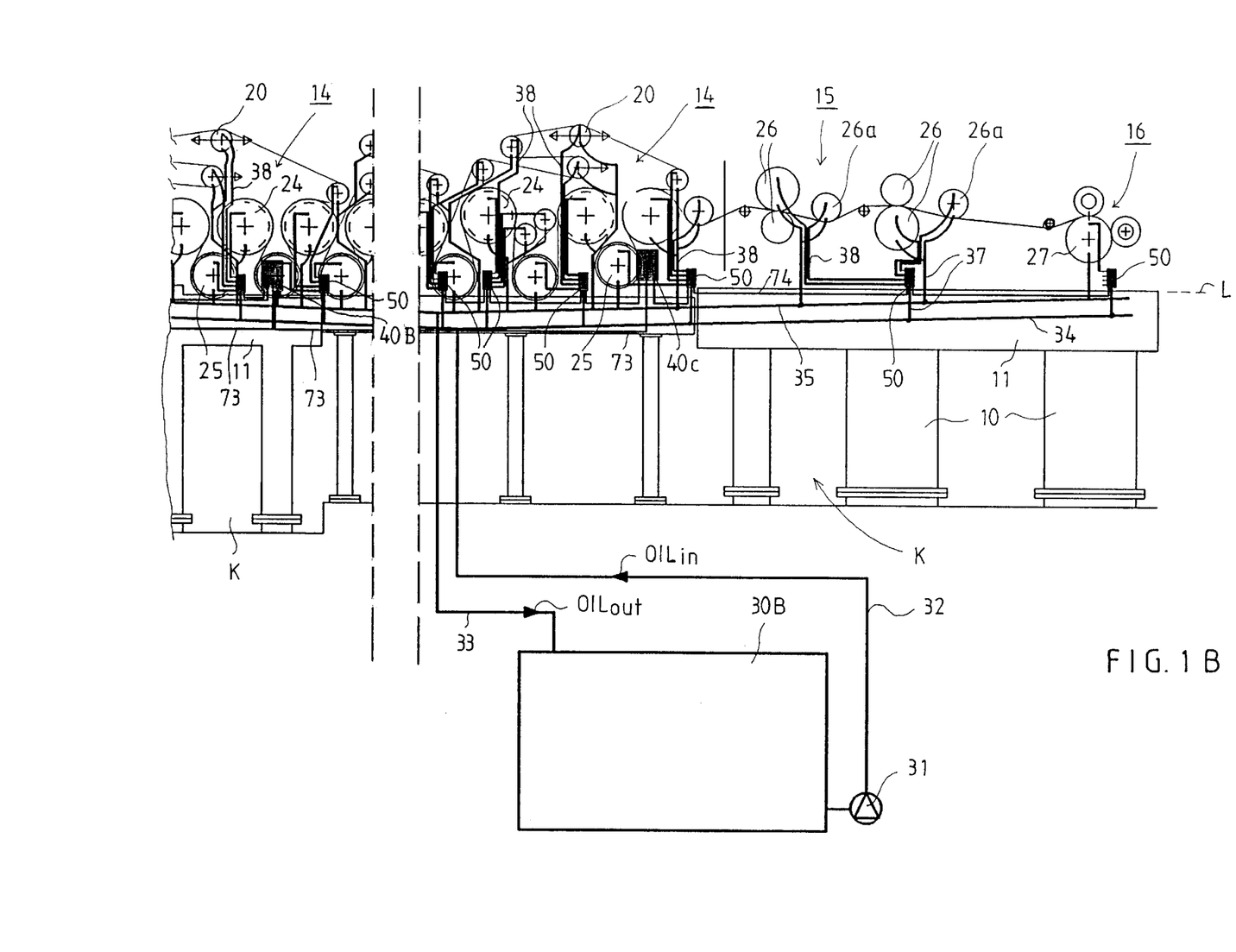
FIG. 1B shows the dry end of the paper machine with its different lubrication points as well as the system in accordance with the invention for monitoring and control of circulation lubrication connected with the lubrication points.

Referring to the accompanying drawings wherein the same reference numerals refer to the same or similar elements, FIG. 1A shows the wet end of a paper machine, which comprises a former 12 and a press section 13. FIG. 1A also shows the initial end of a dryer section 14 following after the press section 13. On the other hand, FIG. 1B shows the dryer section 14, a part of whose length has been cut off, and two successive soft-calender nips 26 as a finishing device 15 after the dryer section 14, the latter of the nips 26 being followed by a machine reel-up 16. Underneath the paper machine, there is the basement space K, in which there are vertical frames 10 both at the tending side and at the driving side of the machine, as well as horizontal frames 11 that connect the vertical frames 10 at the upper region. On support of the horizontal frames 11, there is the floor level of the paper machine hall and the lateral frames of the paper machine (not shown).

In FIGS. 1A and 1B, the guide rolls 20 are shown as lubrication points, including the guide rolls and tensioning rolls of the various fabrics. By lubrication point, it is meant that the guide rolls required a flow of lubricant during use.

As further lubrication points, FIGS. 1A and 1B show forming rolls 21 and suction rolls 22 in the former 12. By means of the last suction roll 22 in the former 12, the paper web W is transferred at the pick-up point P onto the lower face of the upper press felt, which carries the web W into the first press nip N1. As lubrication points, FIG. 1A also shows press rolls 23 in the press section 12, which rolls form successive press nips N1, N2 and N3, as well as the press rolls of the separate nip N4. As lubrication points, FIG. 1B also shows steam-heated drying cylinders 24 as well as reversing cylinders 25 arranged between and below them, which may be for example the current assignee's VAC™ rolls. As lubrication points after the dryer section 14, the calender rolls 26 and paper guide rolls 26a as well as a reeling cylinder 27 are shown.

Even though, above and in the following, various cylinders and rolls 20–26, 26a are mentioned as lubrication points, what is meant thereby is, more specifically, the bearings provided on the axle journals at both ends of the rolls, i.e., the bearings of the revolving components at the tending side and at the driving side of the machine.

In accordance with the invention, directly underneath the floor level L—L of the paper machine hall, both at the tending side and at the driving side of the machine, main distributor pipes 34 and 35 of circulation lubricant are arranged in the machine direction of the paper machine. Pipe 34 is the supply pipe of the lubrication oil and the pipe 35 is the return pipe of the oil. Pairs of the main pipes 34 and 35 communicate with a respective one of a pair of oil-lubrication centers or storage facilities 30A and 30B through a respective supply pipe 32 and a respective return pipe 33 (FIGS. 1A and 1B).

From the oil-lubrication centers 30A and 30B, the lubrication oil is fed by means of pumps 31 through the supply pipes 32 into the main distributor pipe 34 at the supply side, from there further by means of distributor pipes 36 into different actuator panels 50. From the actuator panels 50, the lubrication oil is fed to the bearings of the different lubrication points 20–27 by means of supply pipes 38. The oil returns from the lubrication points through return pipes 37 into the return-side main pipes 35 in the machine direction and from main pipes 35 further through the respective return pipes 33 into the oil-lubrication centers 30A, 30B.

As shown in FIGS. 1A and 1B, there are two oil-lubrication centers 30A, 30B, the first one for the wet end and the second one for the dry end of the machine. Pairs of distributor pipes 34, 35 are provided both at the tending side and at the driving side of the machine, i.e., to lubricate the bearings at the tending side and the bearings at the driving side, respectively, each of the pairs of pipes 34, 35 communicating with the lubrication centers 30A, 30B.

FIG. 1A shows the display and control unit 70 of the control and monitoring system of circulation lubricant, which unit is connected through a first data transfer bus 73 to actuator coordinators 40A and 40B. On the other hand, the actuator coordinators 40A, 40B are connected with data transfer buses 57 of their actuator panels 50 through second data transfer buses 74.

Above, in FIGS. 1A and 1B, just one environment of application of the invention is shown, and it should be emphasized that the invention can also be applied to many other environments of application. Besides to paper machines, the invention can also be applied to other paper processing machines or equivalent, such as finishing machines, for example calenders, slitters, winders, and also to other machines which treat a web-like material and in which there is a great number of revolving lubrication points, e.g., in textile and printing machines. The most typical environment of application of the invention is, however, a paper machine, in which the various advantages of the invention come out with particular emphasis.

Figure 2:
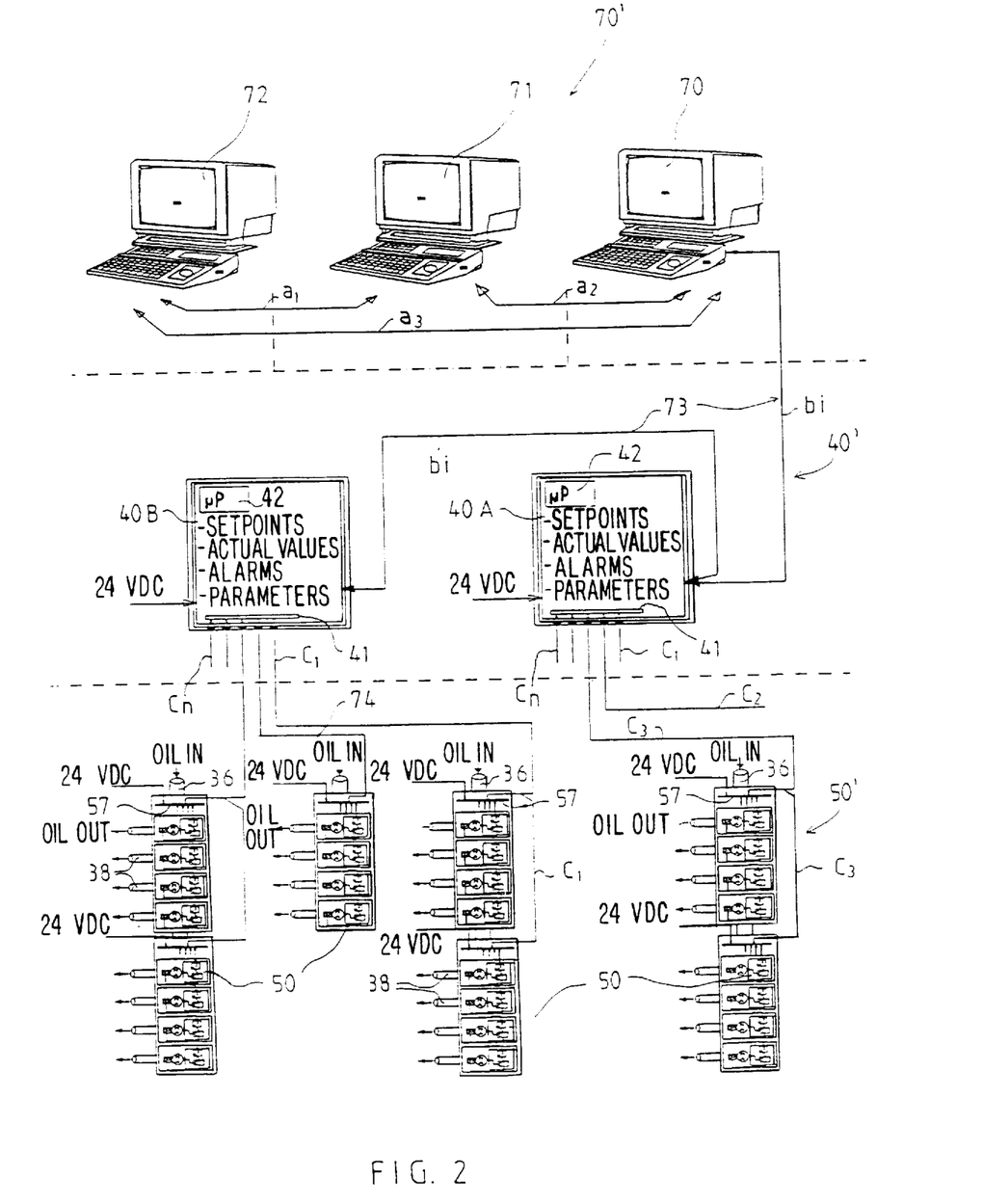
FIG. 2 is a schematic illustration, partly as a block diagram, of the whole of the system in accordance with the invention for monitoring and control of circulation lubrication with the different levels of hierarchy.

In the following, mainly with reference to FIG. 2, a more detailed embodiment of the system of monitoring and control in accordance with the invention will be described. As shown in FIG. 2, the system of control and monitoring of the circulation lubrication is basically divided into three hierarchal levels, of which the highest level 70' comprises the units 70, 71, 72 interconnected by means of the buses a1, a2, a3. The highest level 70' is connected through the first bus 73 with the middle actuator-coordinator level 40', which is again connected with the lower actuator level 50' by means of the second buses 74.

The different actuator panels 50, to which several lubrication points 20–27 are connected through the oil supply pipes 38, communicate with the actuator coordinators 40A and 40B through the data transfer bus 73, of which coordinators 40A and 40B there are, thus, two pairs, placed directly above the floor level L—L of the machine. The actuator coordinators 40A and 40B are connected through the first buses 73 with each other and with the control and display unit 70. The unit 70 is connected through the data transfer buses a1, a2 and a3 with the process automation units 71 and 72 of the paper machine, of which units, the unit 71 is a DCS="Distributed Control System" (process control system), and the unit 72 is a PLC="Programmable Logic Controller" (programmable logic). By means of the buses a1 and a2, the control and display unit 70 seeks the necessary data concerning the papermaking process, for example the running speed of the paper machine, the steam pressures, and/or equivalent. In the control and display unit 70, the set values and alarms values of the system of control and monitoring of the circulation lubrication in accordance with the invention are calculated, which values are passed to the microprocessors 42 of the actuator coordinators 40A and 40B through the buses 73. By means of the control and display unit 70, the lubrication process is monitored, for example its actual values and possible alarms and equivalent.

Figure 3:
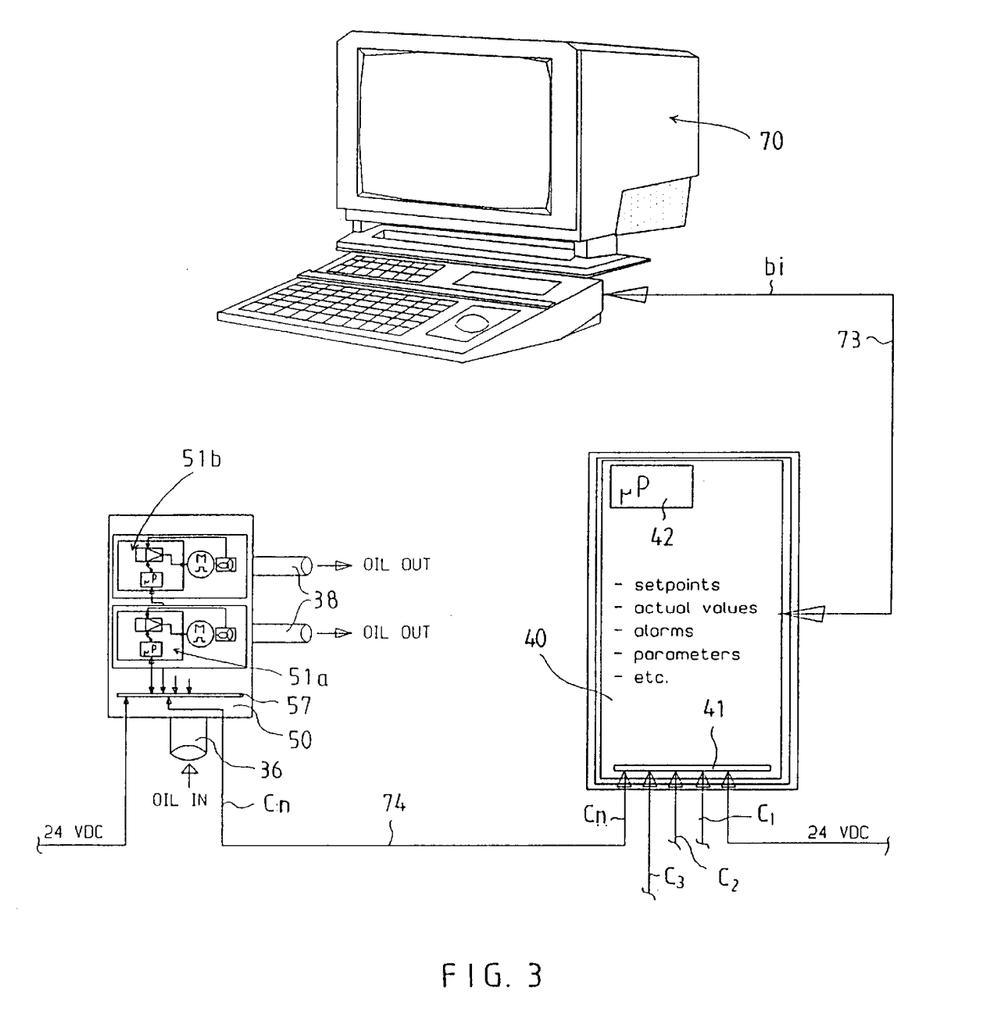
FIG. 3 illustrates one flow-meter regulation circuit in the system of monitoring and control in accordance with the invention.

The control and display unit 70 transmits the set values through the bus 73 as well as reads and transfers the required data from its actuator coordinators 40A and 40B through the same bus 73. The bus 73 is, for example, the RS-485 bus, whose signals are denoted with the reference b1. The actuator-coordinator level 40' communicates both with the upper level 70' and with the lower actuator level 50'. The actuator coordinators 40A and 40B transmit the set values, the parametering values, and equivalent data to the actuator panels 50. Further, the necessary alarms are formed in the actuator coordinators 40A and 40B. Typically, an actuator coordinator 40 may be connected with a maximum of 48 actuators 51a, 51b, . . . (FIG. 3).

Typically, the actuator panels 50 comprise units of two or four actuators 51a, 51b. Both the actuator coordinators 40A, 40B and the actuator panels 50 include data transfer buses 41 and 57, respectively, which communicate with each other through the second buses 74. The signals passing in the buses 74 are denoted by the references c1, . . . , cn. A number of actuator panels 51a, 51b, . . . can be connected one after the other.

Figure 4:
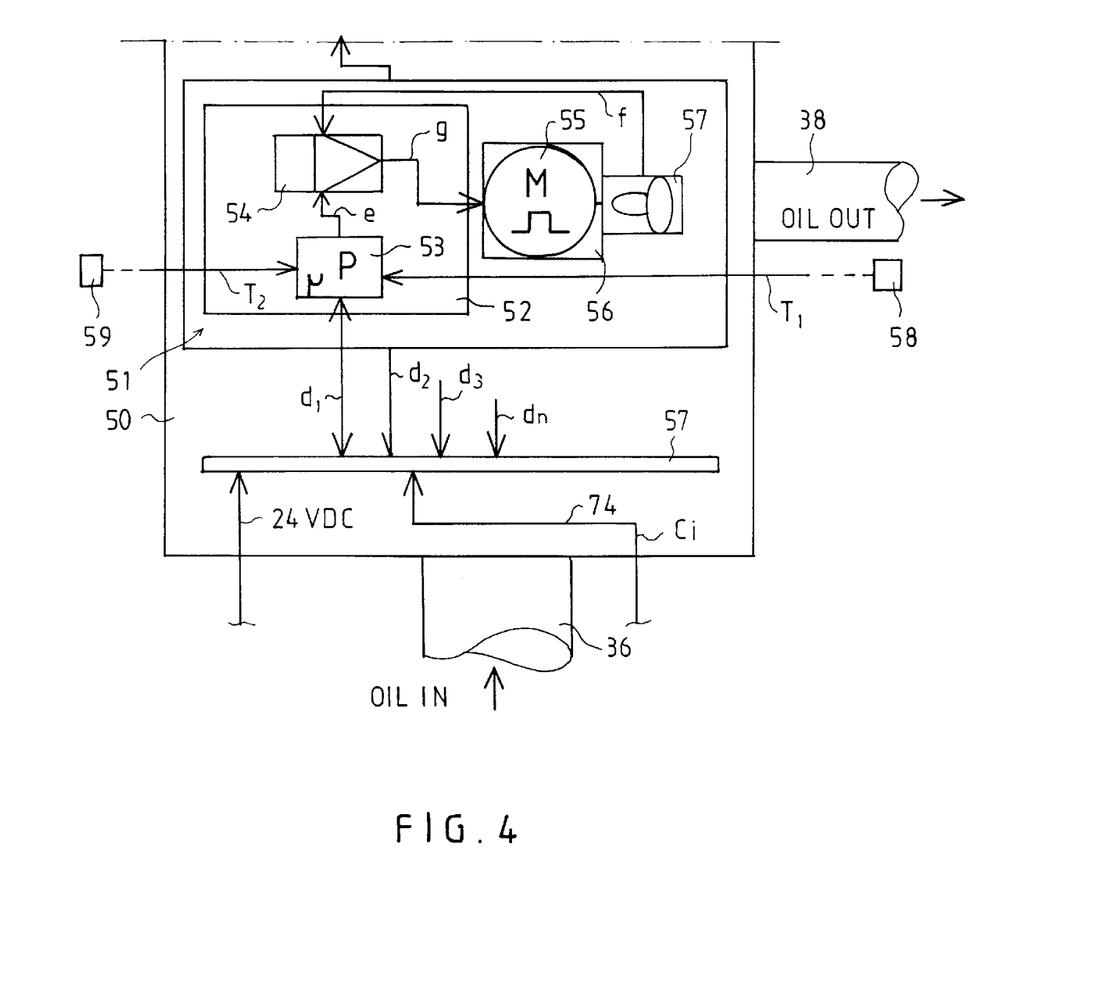
FIG. 4 is a schematic illustration of a flow-meter regulator placed in the oil pipe passing into the lubrication point as well as of the connection of the flow-meter regulator with the higher system.

FIG. 4 shows an exemplifying embodiment of an actuator panel 50 and of one of its actuators 51. The actuator group includes a connection for the distributor pipe 36 for the circulation lubrication, which is also called a lubricant intake pipe, a connection for the voltage supply 24 V DC, a connection for a serial transmission bus 57, and connections for the signals d1, . . . , dn of the different actuators 51. Further, the actuator 51 includes a microprocessor controller 53 which performs the control of the regulation of the lubricant flow passing to the lubrication points 20–27 through a control valve 56 of the actuator from the distributor pipe 36 to the outlet supply pipe 38 independently. Further, the actuator 51 includes a regulation circuit 52, in which there is the microprocessor controller 53 and a regulation control 54. The regulation valve 56 for the oil flow to the different lubrication points 20–27 is connected with a stepping motor 55. In connection with, or in the vicinity of, the regulation valve 56, there is an oil quantity flow meter 57, for example an elliptic-gear meter, which gives its flow measurement signal f to the regulation control 54. The regulation control 54 again controls the stepping motor 55 by means of the signal g. In this manner, a closed regulation loop 54-g-55-56-57-f is formed, to which the set value e is given by the microprocessor controller 53. On the other hand, the microprocessor controller 53 communicates with the bus 57 through the connection d1 and further, through the second bus 74, with its actuator coordinator 40A, 40B.

The electronic system of the regulation circuit 52 shown in FIG. 4 is capable of independently measuring the speed of rotation of the meter 57 and controlling the stepping motor 55 so that the flow is regulated and remains at the set value e given by the microprocessor controller 53. The speed of rotation of the elliptic gear or equivalent in the meter 57 is measured, for example, by means of a coil detector. An intelligent regulation circuit 52 is carried into effect, for example, by means of a hybrid circuit, for which all the necessary components are made, such as voltage regulation, microprocessor 53, memories, oscillator, output stages of the stepping motor 55, coil-detector electronics, RS-485 interface circuit, and a LED that indicates rotation of the elliptic gear in the meter 57. The hybrid circuit is dimensioned so that it withstands the determined conditions, such as temperature and moisture, and, moreover, it is installed on the flow meter 57 as close to the oil space 36–38 as possible, whereby the temperature of the hybrid circuit does not become higher than the temperature T1 of the oil. Each of the hybrid circuits is provided with an individual serial number of its own, which number, at the same time, also operates as the device address of the serial interface. This serial number is also transferred to the meter beam, by whose means it is identified with which bearing position each of the actuators is connected.

The actuator coordinators 40A, 40B comprise, e.g., a processor card and of one mother card. The processor card is a general card carried out by means of a, for example, 16-bit processor 42 and including an application program. The mother card operates as an interface card so that all outside cables are connected to it. The mother card also includes the necessary voltage regulations, the serial interfaces between the PC and actuator panels 50, the temperature measurement inputs, the digital control inputs and outputs, and, moreover, as an option, if necessary, a monitor/keyboard interface.

The actuator coordinators 40A, 40B supervise the regulation operation of the intelligent actuators 51a, 51b, . . . so that they transmit data to the detectors as to whether the measurement point concerned is in a manual or automatic position, and moreover, when the detector notices a need of regulation, it asks the coordinator 40A, 40B for permission for regulation and regulates only after it has obtained the permission. By means of this permission procedure, the power taken by the stepping motors 55 is also limited so that just one motor 55 per coordinator 40A, 40B is controlled at a time with the time-share principle.

The system of control and monitoring for circulation lubrication in accordance with the invention operates, as regards the system levels 40' and 70', with the time-share principle so that, by the intermediate of the buses 57, 74, the actuator coordinators 40A, 40B multiplex the set values, alarms, and the other actuator parameters for the different actuator panels 50 and, at the same time, seek the actual values of the actuators 51a, 51b, . . . from them. During one operation cycle, the actuator coordinator 40A, 40B deals with all the actuator panels 50 connected to it and then starts a new cycle. The system can also be connected with measurement, alarms, and regulation based on the measurement concerning other parameters of the papermaking process and concerning the parameters of each lubrication point. This is illustrated schematically in FIG. 4 by the detector 58 of measurement of the temperature T1 of the return oil, which detector is arranged in connection with the oil return pipe 37 and which gives the measurement signal T1 to the microprocessor 53 of the regulator 52 of the actuator 51. Moreover, in FIG. 4, the detector 59 for measurement of the temperature T2 of the lubrication point 20–27 is shown, which detector gives the measurement signal T2 to the microprocessor 53. By means of the temperature signals T1 and/or T2 and/or by means of other, corresponding signals, the set value signal e given by the microprocessor 53 to the regulator 54 is affected in a suitable way.

The examples provided above are not meant to be exclusive. Many other variations of the present invention would be obvious to those skilled in the art, and are contemplated to be within the scope of the appended claims.

We claim:

1. A system for control and monitoring of circulation lubrication of bearings of revolving cylinders and rolls in a paper machine situated in a paper machine hall and arranged at a floor level of the paper machine hall, comprising:

at least one oil-lubrication storage means, actuator panels arranged above the floor level of the paper machine hall, first pipe means for feeding lubrication oil from said at least one oil-lubrication storage means to each of said actuator panels, second pipe means for feeding lubrication oil from each of said actuator panels to lubrication points constituting the bearings of the revolving cylinders and rolls situated in a region proximate to said respective actuator panel, said second pipe means comprising a plurality of pipes each leading from a respective one of said actuator panels to a respective lubrication point associated with said respective actuator panel, and third pipe means for feeding lubrication oil from said lubrication points to said at least one oil-lubrication storage means, each of said actuator panels comprising a plurality of flow regulation means for regulating the quantity of the flow of lubrication oil through a respective one of said pipes of said second pipe means associated with said actuator panel, each of said regulation means comprising an oil-flow regulation valve, an actuator motor for actuating said oil-flow regulation valve, measurement means for measuring the oil flow through said oil-flow regulation valve and a regulation circuit for controlling said actuator motor.

2. The system of claim 1, further comprising
a control and display unit for the paper machine,
at least one actuator coordinator for controlling operation of said actuator panels,
a first data transfer bus for coupling said control and display unit and said at least one actuator coordinator, and
a second data transfer bus for coupling said at least one actuator coordinator and said actuator panels.

3. The system of claim 2, wherein said at least one actuator coordinator sends a control signal to said regulation circuit in each of said actuator panels and receives values of physical properties from said lubrication points through said second data transfer bus, said values of physical properties being transferred from said at least one actuator coordinator to said control and display unit through said first data transfer bus.

4. The system of claim 2, wherein the paper machine includes a tending platform, said actuator panels and said at least one actuator coordinator being arranged substantially on or near the tending platform of the paper machine and being protected so as to withstand heat, moisture and chemicals in the environment.

5. The system of claim 2, wherein the paper machine includes a process automation system, further comprising a third data transfer bus for coupling said display and control unit to the process automation system, process data necessary for monitoring of circulation lubrication of the lubrication oil being transferred from the process automation system to said display and control unit, said display and control unit determining set values and alarm values based on the process data and transferring the set values and alarm values to said at least one actuator coordinator through said first data transfer bus, said display and control unit monitoring actual values and alarms of the circulation lubrication process.

6. The system of claim 2, wherein said at least one actuator coordinator forms alarms of the system and transmits set values, parametering values, and/or equivalent data to said actuator panels, said at least one actuator coordinator being connected to a maximum of about 48 of said actuator panels.

7. The system of claim 2, wherein each of said actuator panels comprises a plurality of actuators, each of said actuators being arranged in connection with one of said regulation means, said actuator panels comprising groups of two or four of said actuators connected one after the other, each of said groups including connections for said second pipe means, for a voltage supply for said regulation circuit of said regulation means, for a serial transmission bus, and for each of said actuators.

8. The system of claim 2, wherein said regulation circuits of said actuator panels comprise a microprocessor controller for independently measuring and regulating the oil flow to said lubrication points connected to said regulation circuit.

9. The system of claim 2, wherein said actuator motor is a stepping motor and said measurement means comprise an elliptic-gear meter, said stepping motor and said elliptic-gear meter being integrated in connection with said regulation circuit, said regulation circuit comprising a microprocessor controller and a regulation controller.

10. The system of claim 1, wherein said first pipe means comprise a main oil supply pipe arranged substantially in the machine direction at each of a tending side of the machine and a driving side of the machine in a vicinity of the floor level and an oil intake pipe for connecting each of said main oil supply pipes and said at least one oil storage means and said third pipe means comprise a main return oil supply pipe arranged substantially in the machine direction at each of the tending side of the machine and the driving side of the machine in the vicinity of the floor level and an oil intake pipe for connecting each of said main return oil pipes and said at least one oil storage means.

11. The system of claim 2, wherein each of said actuator panels comprises a plurality of actuators, each of said actuators being arranged in connection with one of said regulation means, the system operating according to a time-share principle such that said at least one actuator coordinator multiplexes set values, alarm and/or other actuator parameters through said second data transfer bus to said actuator panels connected to said at least one actuator coordinator and obtains operating data of said actuators from said actuator panels.

12. The system of claim 11, wherein said at least one actuator coordinator deals with all of said actuator panels connected thereto during one operation cycle, after which a new operation cycle starts.

13. A method for control and monitoring of circulation lubrication of bearings of revolving cylinders and rolls in a paper machine situated in a paper machine hall and arranged at a floor level of the paper machine hall, comprising the steps of:

arranging actuator panels above the floor level of the paper machine hall, feeding lubrication oil from at least one oil-lubrication storage means to each of said actuator panels, feeding the lubrication oil from each of said actuator panels to a plurality of lubrication points constituting the bearings of the revolving cylinders and rolls and being situated in a region proximate to said respective actuator panel, feeding the lubrication oil from said lubrication points to said at least one oil-lubrication storage means, regulating the quantity of the flow of the lubrication oil through said actuator panels to each of said lubrication points, controlling operation of said actuator panels by means of at least one actuator coordinator, coupling a control and display unit and said at least one actuator coordinator through a first data transfer bus, and coupling said at least one actuator coordinator and said actuator panels through a second data transfer bus.

14. The method of claim 13, wherein the regulating step comprises, for each of said lubrication points, the steps of:

passing the lubrication oil through a regulation valve, actuating said regulation valve to vary the flow quantity of the lubrication oil to said lubrication point, measuring the flow of lubrication oil through said regulation valve, and controlling the actuation of said regulation valve based on the measured flow of lubrication oil through said regulation valve.

15. The method of claim 13, wherein said step of controlling operation of said actuator panels by means of at least one actuator coordinator comprises the step of generating control signals in said at least one actuator coordinator, further comprising the steps of:

sending the control signals from said at least one actuator coordinator to said actuator panels and sending values of physical properties from said lubrication points to said at least one actuator coordinator through said second data transfer bus, and transferring said values of physical properties from said at least one actuator coordinator to said control and display unit through said first data transfer bus.

16. The method of claim 13, further comprising the steps of:

coupling said display and control unit to a process automation system of the paper machine through a third data transfer bus, transferring process data necessary for monitoring of circulation lubrication of the lubrication oil from the process automation system to said display and control unit, determining set values and alarm values based on the process data in said display and control unit, transferring the set values and alarm values from said display and control unit to said at least one actuator coordinator through said first data transfer bus, and monitoring actual values and alarms of the circulation lubrication process in said display and control unit.

17. The method of claim 13, further comprising the steps of:

forming alarms of the system in said at least one actuator coordinator, and transmitting set values, parametering values, and/or equivalent data from said at least one actuator coordinator to said actuator panels.

18. The method of claim 13, further comprising the step of independently measuring and regulating the oil flow to said lubrication points.

19. The method of claim 14, wherein each of said actuator panels comprises a plurality of actuators, each of said actuators being arranged in connection with one of said regulation valves, further comprising the step of operating according to a time-share principle such that said at least one actuator coordinator multiplexes set values, alarm and/or other actuator parameters through said second data transfer bus to said actuator panels connected to said at least one actuator coordinator and obtains operating data of said actuators from said actuator panels.

* * * * *